(12) United States Patent
Cha et al.

(10) Patent No.: US 10,708,552 B2
(45) Date of Patent: Jul. 7, 2020

(54) VEHICLE DRIVING ASSISTANT DEVICE (71) Applicant: MOBILE APPLIANCE, INC., Anyang-si, Gyeonggi-do (KR)

(72) Inventors: Kyoung Hwan Cha, Seoul (KR); Jong Hoon Lim, Gwangju-si (KR)

(73) Assignee: MOBILE APPLIANCE, INC., Anyang-si (KR)

( * ) Notice: Subject to any disclaimer, the term of this patent is extended or adjusted under 35 U.S.C. 154(b) by 0 days.

(21) Appl. No.: 16/317,282

(22) PCT Filed: Jul. 12, 2017

(86) PCT No.: PCT/KR2017/007467
§ 371 (c)(1),
(2) Date: Jan. 11, 2019

(87) PCT Pub. No.: WO2018/012879
PCT Pub. Date: Jan. 18, 2018

(65) Prior Publication Data
US 2019/0246076 A1    Aug. 8, 2019

(30) Foreign Application Priority Data

Jul. 13, 2016 (KR) .......................... 10-2016-0088894

(51) Int. Cl.
*H04N 7/18* (2006.01)
*B60W 40/02* (2006.01)
(Continued)

(52) U.S. Cl.
CPC ............... *H04N 7/183* (2013.01); *B60Q 9/00* (2013.01); *B60W 30/08* (2013.01); *B60W 40/02* (2013.01);
(Continued)

(58) Field of Classification Search
CPC .... H04N 7/183; G06K 9/00791; G01P 15/18; B60Q 9/00; Y02T 90/14; B60Y 2400/304;
(Continued)

(56) References Cited

U.S. PATENT DOCUMENTS 7,313,467 B2 * 12/2007 Breed ................. G07C 5/008
307/9.1
8,237,795 B2 * 8/2012 Mizusawa ............ B60R 1/00
348/148
(Continued)

FOREIGN PATENT DOCUMENTS

JP    2008-258778 A    10/2008
JP    2013-020308 A    1/2013
(Continued)

OTHER PUBLICATIONS

Ghahroudi et al, A hybrid method in driver and multisensor data fusion, using a fuzzy logic supervisor for vehicle intelligence (Year: 2007).*

*Primary Examiner* — Shan E Elahi
(74) *Attorney, Agent, or Firm* — Novick, Kim & Lee, PLLC; Sang Ho Lee (57) ABSTRACT

Provided is a vehicle driving assistant device, including: a sensor module; a camera module which photographs images; and a control module which calculates a gradient value of a ground where a vehicle is located based on a first center axis value measured by the sensor module when a front side of the vehicle is located in a first direction after being mounted and a second center axis value measured by the sensor module when the front side of the vehicle is located in a second direction which is opposite to the first direction and determines an effective area for following an object in the image based on a center axis fixing error value
(Continued)

of the sensor module calculated using at least one of the first and second center axis values and the gradient value.

12 Claims, 5 Drawing Sheets

(51) Int. Cl.
    *B60W 30/08*         (2012.01)
    *B60W 50/02*         (2012.01)
    *B60Q 9/00*          (2006.01)
    *B60W 40/076*       (2012.01)
    *G01P 15/18*         (2013.01)
    *G06K 9/00*          (2006.01)

(52) U.S. Cl.
    CPC .......... *B60W 40/076* (2013.01); *B60W 50/02* (2013.01); *G01P 15/18* (2013.01); *G06K 9/00791* (2013.01); *B60W 2552/15* (2020.02); *Y02T 90/14* (2013.01)

(58) Field of Classification Search
    CPC .......... B60Y 2300/08; B60W 2420/42; B60W 50/02; B60W 30/08; B60W 40/02; B60W 40/076; B60W 2550/142
    USPC ......................................................... 348/148
    See application file for complete search history.

(56) References Cited

U.S. PATENT DOCUMENTS

| | | | | |
|---|---|---|---|---|
| 9,129,460 | B2* | 9/2015 | McClellan | G07C 5/008 |
| 10,303,168 | B2* | 5/2019 | Horita | B60W 50/14 |
| 2001/0023381 | A1* | 9/2001 | Makino | B60W 40/02 |
| | | | | 701/28 |
| 2002/0124260 | A1* | 9/2002 | Rivera | B60R 1/00 |
| | | | | 725/105 |
| 2006/0185914 | A1* | 8/2006 | Hommi | B60L 15/2009 |
| | | | | 180/65.1 |
| 2006/0208169 | A1* | 9/2006 | Breed | B60N 2/002 |
| | | | | 250/221 |
| 2006/0241718 | A1* | 10/2006 | Tyler | A61B 5/0492 |
| | | | | 607/45 |
| 2010/0250106 | A1* | 9/2010 | Bai | G08G 1/096716 |
| | | | | 701/117 |
| 2012/0140073 | A1* | 6/2012 | Ohta | B60R 1/00 |
| | | | | 348/148 |
| 2013/0106993 | A1* | 5/2013 | Schofield | B60N 2/002 |
| | | | | 348/36 |
| 2013/0242582 | A1* | 9/2013 | Schofield | B60Q 1/1423 |
| | | | | 362/466 |
| 2014/0303870 | A1* | 10/2014 | Switkes | G08G 1/166 |
| | | | | 701/96 |
| 2015/0019158 | A1* | 1/2015 | Sannodo | B60W 30/18109 |
| | | | | 702/141 |
| 2015/0344032 | A1* | 12/2015 | Oh | B60W 10/22 |
| | | | | 701/37 |
| 2015/0352955 | A1* | 12/2015 | Mori | B60K 35/00 |
| | | | | 701/1 |
| 2016/0001781 | A1* | 1/2016 | Fung | G16H 50/20 |
| | | | | 701/36 |
| 2016/0332627 | A1* | 11/2016 | Yoon | B60W 30/18063 |
| 2016/0365175 | A1* | 12/2016 | Bennett | H04B 3/52 |
| 2017/0329328 | A1* | 11/2017 | Horita | B60W 50/14 |

FOREIGN PATENT DOCUMENTS

| | | |
|---|---|---|
| JP | 2014-082622 A | 5/2014 |
| KR | 10-1406230 B1 | 6/2014 |
| WO | 2008/087778 A1 | 7/2008 |

* cited by examiner

VEHICLE DRIVING ASSISTANT DEVICE

TECHNICAL FIELD

The present invention relates to a vehicle driving assistant device, and more particularly, to a vehicle driving assistant device which easily determines an effective area which follows an object to perform a vehicle driving assisting function when it is mounted in a vehicle.

BACKGROUND ART

A vehicle is a device which moves an on-boarding user to a desired direction. An automobile is a representative example of the vehicle.

The automobile is classified into an internal combustion engine vehicle, an external combustion engine vehicle, a gas turbine vehicle, and an electric vehicle in accordance with a used prime mover.

The electric vehicle refers to a vehicle which rotates an electric motor using electricity as energy and includes a pure electric vehicle, a hybrid electric vehicle (HEV), a plug-in hybrid electric vehicle (PHEV), and a hydrogen fuel cell electric vehicle (FCEV) as examples.

Recently, an intelligent vehicle (smart vehicle) is being actively developed for the convenience and safety of drivers and pedestrians.

The intelligent vehicle is a high-tech vehicle in which an information technology (IT) technique is fused and is also referred to as a smart vehicle. The intelligent vehicle not only introduces an advanced system for the vehicle, but also provides an optimal traffic efficiency through interworking with an intelligent traffic system (ITS).

Further, sensors mounted in such an intelligent vehicle are being actively studied. Specifically, a camera, an infrared sensor, a radar, a GPS, a Lidar, and a gyroscope are used for the intelligent vehicle and among them, the camera occupies an important position as a sensor which replaces a function of eyes of human.

Therefore, in accordance with the development of various sensors and various electronic equipment, vehicles equipped with an advanced driver assistant system (ADAS) which assists the driving of a driver and improves driving safety and convenience attract attention.

Recently, studies are conducted to correct an effective area extracted from an image to follow an object by identifying a warpage due to an installation error or a production error when the vehicle driving assistant device is mounted in the vehicle and initializing the warpage.

DISCLOSURE

Technical Problem

An object of the present invention is to provide a vehicle driving assistant device which easily determines an effective area following an object to perform a vehicle driving assisting function when it is mounted in the vehicle.

Technical Solution

According to the present invention, a vehicle driving assistant device includes: a sensor module; a camera module which photographs images; and a control module which calculates a gradient value of a ground where the vehicle is located based on a first center axis value measured by the sensor module when a front side of the vehicle is located in a first direction after being mounted and a second center axis value measured by the sensor module when the front side of the vehicle is located in a second direction which is opposite to the first direction and determines an effective area for following an object in the image based on a center axis fixing error value of the sensor module calculated using at least one of the first and second center axis values and the gradient value.

The sensor module may include: a sensor unit which outputs an acceleration signal; and a signal processing unit which processes the acceleration signal to calculate at least one of the first and second center axis values.

The sensor unit may include a tri-axial accelerometer which outputs the acceleration signal.

The signal processing unit may output the first and second center axis values after converting the acceleration signal into a digital signal.

The control module may include: a gradient value calculating unit which calculates the gradient value with the first and second center axis values; an area determining unit which calculates the center axis fixing error value based on at least one of the first and second center axis values and the gradient value and determines the effective area with the center axis fixing error value; and a following control unit which follows the object in the effective area when a vehicle driving assisting function is performed.

When the gradient value is larger than a set reference gradient value, the area determining unit determines that there is an error in determination of the effective area to output a determination error signal to the following control unit.

The control module may further include: an error alarming unit which outputs an error alarm and the following control unit may control the error alarming unit to output the error alarm when the determination error signal is input.

The area determining unit shifts a reference effective area set by a shift value corresponding to the center axis fixing error value to determine the effective area.

The center axis fixing error value may include a process error value obtained when the sensor module is warped at the time of being soldered to a printed circuit board and a mounting error value obtained when the sensor module is warped at the time of being mounted in the vehicle.

Advantageous Effects

According to the present invention, a vehicle driving assistant device has an advantage in that when the device is mounted in the vehicle, a warpage of at least one of the camera module and the sensor module is identified to determine an effective area extracted from an image captured by the camera module to follow an object, thereby ensuring a reliability when the vehicle driving assistant function is performed.

Further, according to the present invention, the vehicle driving assistant device has an advantage in that when the effective area is determined, correction is autonomously performed without visiting a vehicle service center or a device service center, so that the maintenance is easy.

BRIEF DESCRIPTION OF DRAWINGS

FIGS. 2 to 4B are views for explaining an operation of the vehicle driving assistant device illustrated in FIG. 1.

BEST MODE

Hereinafter, exemplary embodiments disclosed the present invention will be described in detail with reference to the accompanying drawings, and the same or similar components are denoted by the same reference numerals regardless of reference numerals, and repeated description thereof will be omitted. Further, such as a "module" and a "unit", suffixes for components used in the following description are given or mixed and used by considering easiness in preparing a specification and do not have a meaning or role distinguished from each other in themselves. In describing the exemplary embodiment disclosed in the present specification, when it is determined that a detailed description of a related publicly known technology may obscure the gist of the exemplary embodiment disclosed in the present specification, the detailed description thereof will be omitted. Further, the accompanying drawings are provided for more understanding of the exemplary embodiment disclosed in the present specification. However, the technical spirit disclosed in the present specification is not limited by the accompanying drawings and it is understood that all changes, equivalents, and substituents included in the spirit and technical scope of the present invention are included.

Terms including an ordinary number, such as first and second, are used for describing various constituent elements, but the constituent elements are not limited by the terms. The above terms are used only to discriminate one component from the other component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

A singular form may include a plural form if there is no clearly opposite meaning in the context.

In the present invention, it should be understood that terminology "include" or "have" indicates that a feature, a number, a step, an operation, a component, a part or the combination those of described in the specification is present, but does not exclude a possibility of presence or addition of one or more other features, numbers, steps, operations, components, parts or combinations, in advance.

Hereinafter, a vehicle driving assistant device according to the exemplary embodiment will be described in detail with reference to the drawings.

Figure 1:
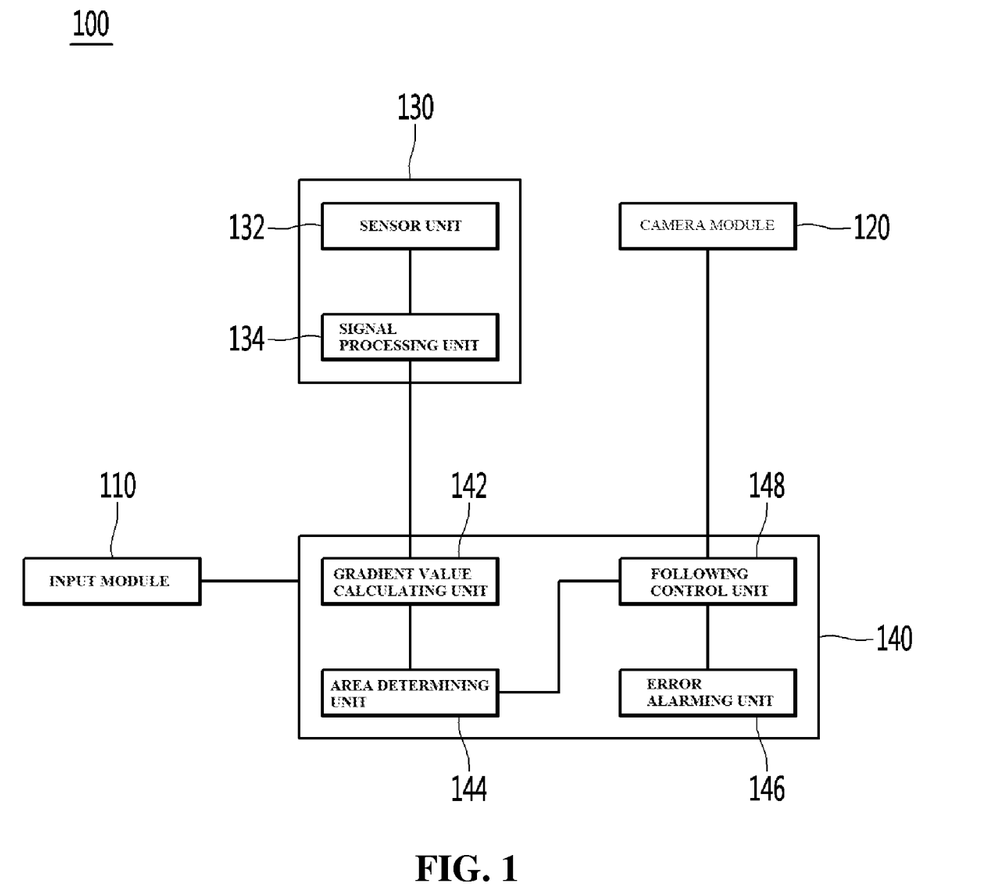
FIG. 1 is a control block diagram illustrating a control configuration of a vehicle driving assistant device according to the present invention.

FIG. 1 is a control block diagram illustrating a control configuration of a vehicle driving assistant device according to the present invention.

Referring to FIG. 1, the vehicle driving assistant device 100 may include an input module 110, a camera module 120, a sensor module 130, and a control module 140.

The input module 110 may input a command to set or correct an effective area for following an object when a driver or a user performs a vehicle driving assisting function immediately after being mounted in the vehicle.

In an exemplary embodiment, the vehicle driving assistant device 110 sets or corrects the effective area in accordance with the command of the input module 110 and also automatically sets or corrects the effective area when power is input after being mounted in the vehicle, but is not limited thereto.

The camera module 120 may include at least one camera sensor, for example, a CCD image sensor and is mounted on a front side of the vehicle to photograph images in a driving direction of the vehicle, but is not limited thereto.

Here, the camera module 120 may photograph images in the driving direction of the vehicle and also photograph images in other directions in accordance with a command of the user, but is not limited thereto.

The sensor module 130 may be mounted in a printed circuit board (not illustrated) to be adjacent to the camera module in at least one of horizontal and vertical directions and measure a value of a center axis of the camera module 120.

Here, the sensor module 130 may include a sensor unit 132 and a signal processing unit 134.

The sensor unit 132 may output tri-axial acceleration signals corresponding to three axial directions of a vehicle located on the ground and include at least one of a tri-axial accelerometer, a magnetic field sensor, and a gravity sensor.

In an exemplary embodiment, the value of the center axis is a value indicating a ground direction among three axial directions, that is, a Y-axis direction and is calculated by a center axis acceleration signal among tri-axial acceleration signals, but is not limited thereto.

The signal processing unit 134 converts the center axis acceleration signal into a digital signal to calculate the center axis value.

The control module 140 may include a gradient value calculating unit 142, an area determining unit 144, an error alarming unit 146, and a following control unit 148.

In an exemplary embodiment, it is described that when a command to set or correct an effective area is input from the input module 110 and the vehicle is located in a first direction and a second direction which is opposite to the first direction by a driver or a user, the control module 140 performs a control algorithm corresponding to the command.

Here, the gradient value calculating unit 142 calculates a gradient value of the ground based on a first center axis value measured by the sensor module 120 when the front side of the vehicle is located in the first direction and a second center axis value measured by the sensor module 120 when the front side of the vehicle is located in the second direction.

The gradient value calculating unit 142 may calculate the gradient value using the following Equation 1.

$$\text{Gradient value} = (\text{First center axis value} - \text{Second center axis value})/2 \quad \text{[Equation 1]}$$

Thereafter, the gradient value calculating unit 142 outputs the gradient value to the area determining unit 144.

When the gradient value is larger than a predetermined reference gradient value, the area determining unit 144 determines that there is an error in the determination of the effective area to output a determination error signal to the following control unit 148, which will be described below.

Further, when the gradient value is smaller than the reference gradient value, the area determining unit 144 may calculate a center axis fixing error value with the first and second center axis values and the gradient value.

In this case, the center axis fixing error value may include a process error value obtained when the sensor module 120 is warped at the time of being soldered to the printed circuit board and a mounting error value obtained when the sensor module 120 is warped at the time of being mounted in the vehicle, but is not limited thereto.

The area determining unit 144 may calculate the center axis fixing error value using the following Equation 2.

$$\text{First center axis value} = \text{Center axis fixing error value} + \text{Gradient value, or}$$

$$\text{Second center axis value} = \text{Center axis fixing error value} - \text{Gradient value} \quad [\text{Equation 2}]$$

Further, the area determining unit 144 shifts a predetermined reference effective area with a set shift value corresponding to the center axis fixing error value to determine the effective area.

The error alarming unit 146 may output an error alarm in accordance with the control of the following control unit 148.

In this case, the error alarming unit 146 may output at least one of a buzzer and light as the error alarm, but is not limited thereto.

When the determination error signal is input, the following control unit 148 may control the error alarming unit 146 to output the error alarm.

Further, when a performing command to perform the vehicle driving assisting function is input through the input module 110 after setting and correcting the effective area, the following control unit 148 extracts the effective area from the image photographed by the camera module 110 to follow an object.

As described above, the vehicle driving assisting device according to the present invention allows the driver or the user to directly set or correct the effective area so that the cost is saved and a consumed time is reduced because the driver or the user does not use the service center.

FIGS. 2 to 4B are views for explaining an operation of a vehicle driving assistant device illustrated in FIG. 1.

First, FIGS. 2 to 4B are views for an operation of calculating a process error value, a mounting error value, and a center axis error value in the vehicle driving assistant device.

Figure 2:
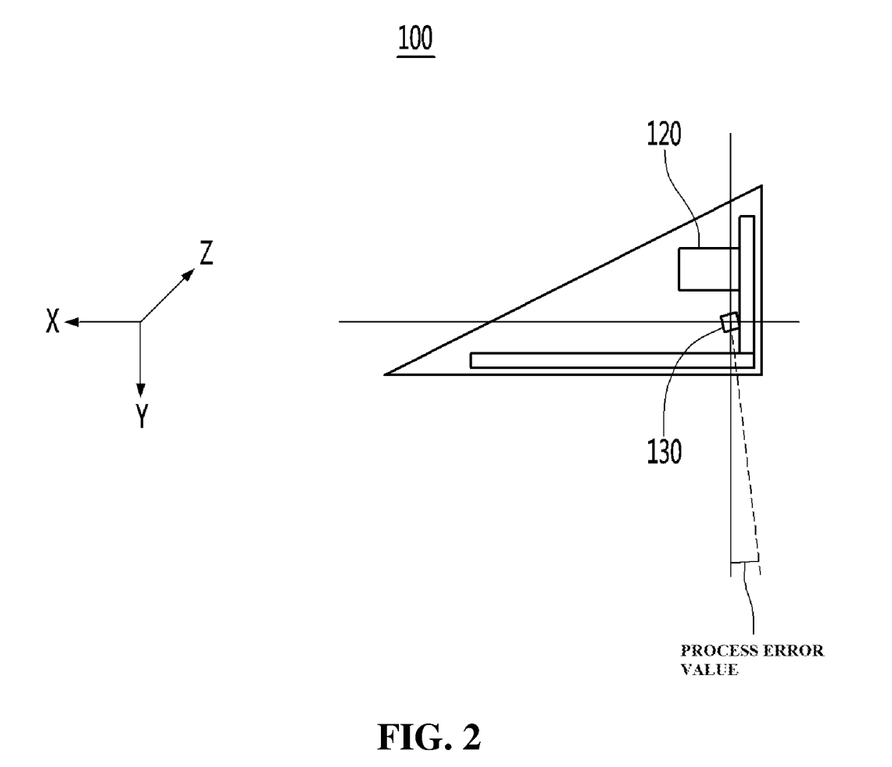

First, FIG. 2 is a view for calculating a process error value of at least one of the sensor module 130 and the camera module 120 in a state when the camera module 120, the sensor module 130, and the control module 140 are coupled to the vehicle driving assistant device.

Here, on the assumption that the camera module 120 is disposed to be parallel to the ground, the sensor module 130 may output a process error value measured in the ground direction to the control module 140.

In this case, based on the fact that the ground is a horizontal surface, when the process error value has a value perpendicular to the ground, the control module 140 may determine that the sensor module 130 is normally mounted on the printed circuit board.

However, when the process error value output from the sensor module 130 does not have a set perpendicular value, the control module 140 may determine that the warpage is generated when the sensor module is mounted in the printed circuit board and store the process error value.

Figure 3:
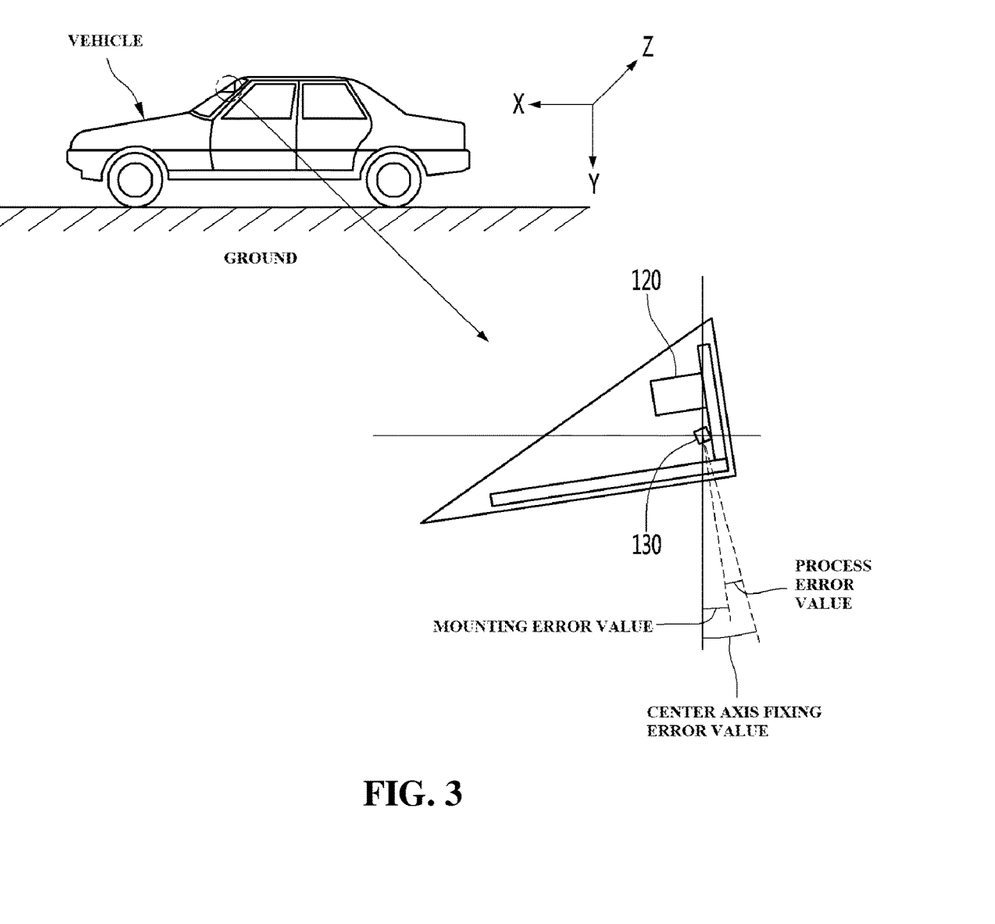

Next, FIG. 3 is a view for checking a mounting error value directly after mounting the vehicle driving assistant device in a vehicle which is located on a flat ground.

That is, referring to FIG. 3, immediately after being mounted in the vehicle, the sensor module 130 may output the measured center axis fixing error value to the control module 140.

Here, the center axis fixing error value may include the process error value calculated in FIG. 2 and the mounting error value.

Therefore, the control module 140 calculates the mounting error value by subtracting the process error value from the center axis fixing error value to store the mounting error value.

Here, the center axis fixing error value may be an overall error value for the sensor module 130 of the vehicle driving assistant device, but is not limited thereto.

Figure 4A:
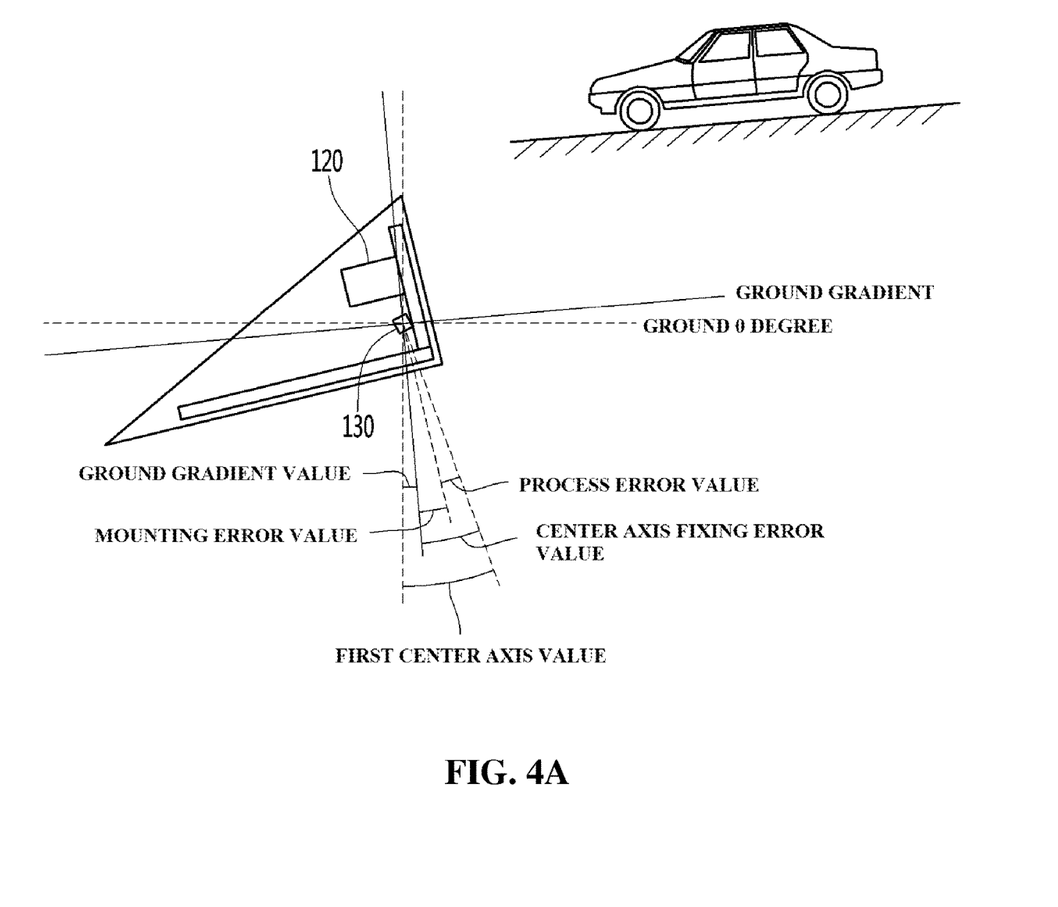
Figure 4B:
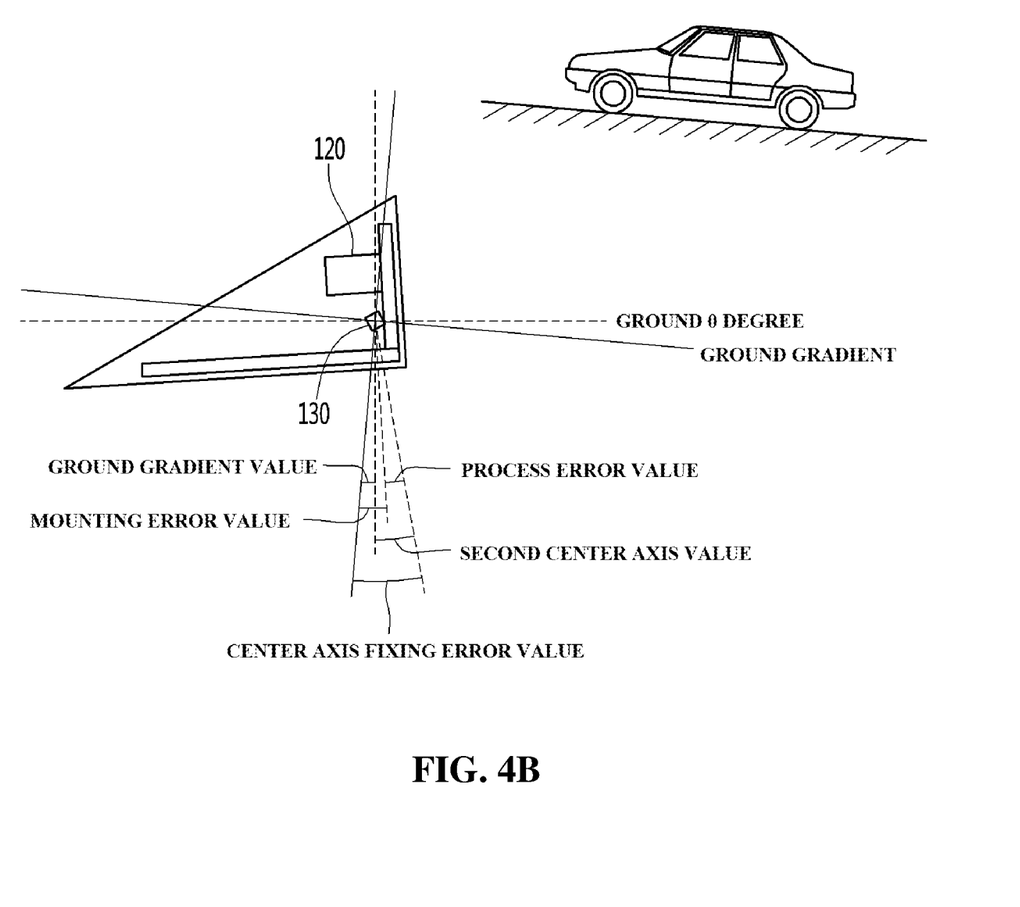

In FIGS. 4A and 4B, after disposing the vehicle in a first direction and a second direction which is opposite to the first direction by the driver or the user to attach the vehicle driving assistant device to the vehicle, a gradient value of the ground is calculated by the first and second center axis values measured in the sensor module 130 and an effective area for following an object in an image photographed by the camera module 120 may be determined based on the center axis fixing error value calculated in FIGS. 2 and 3.

First, in FIG. 4A, when the front side of the vehicle is disposed on the ground in the first direction, the sensor module 130 measures a first center axis value.

In this case, the control module 140 may calculate the ground gradient value by subtracting the set first center axis value from the center axis fixing error value.

As illustrated in FIG. 4B, when the front side of the vehicle is disposed on the ground in the second direction, the sensor module 130 measures a second center axis value.

In this case, the control module 140 may calculate a ground gradient value by subtracting the set center axis fixing error value from the second enter axis value. The ground gradient value calculated in FIG. 4A and the ground gradient value calculated in FIG. 4B may have different signs, but are not limited thereto.

Here, the control module 140 may calculate a final ground gradient value with the ground gradient values calculated in FIGS. 4A and 4B and compare the calculated final ground gradient value with a set reference gradient value to determine an error in the determination of the effective area.

As described above, according to the present invention, the vehicle driving assistant device may allow the driver or the user to easily change a predetermined effective area set at the time of being initially mounted in the vehicle to ensure the reliability of the device.

The features, structures, effects and the like described in the foregoing embodiments are included in at least one embodiment of the present invention and are not necessarily limited to one embodiment. Moreover, the features, structures, effects and the like illustrated in each embodiment may be combined or modified by those skilled in the art for the other embodiments to be carried out. Therefore, the combination and the modification of the present invention are interpreted to be included within the scope of the present invention.

In the above description, the present invention has been described based on the exemplary embodiments, but the exemplary embodiments are for illustrative, and do not limit the present invention, and those skilled in the art will appreciate that various modifications and applications, which are not exemplified in the above description, may be made without departing from the scope of the essential characteristic of the present exemplary embodiments. For example, each constituent element specifically present in the exemplary embodiment may be modified and carried out. Further, the differences related to the modification and the application should be construed as being included in the scope of the present invention defined in the accompanying claims.

The invention claimed is:

1. A vehicle driving assistant device, comprising:
 a sensor module;
 a camera module which photographs images; and
 a control module which calculates a gradient value of a ground where a vehicle is located based on a first center axis value measured by the sensor module when a front side of the vehicle is located in a first direction after being mounted and a second center axis value measured by the sensor module when the front side of the vehicle is located in a second direction which is opposite to the first direction and determines an effective area for following an object in the image based on a center axis fixing error value of the sensor module calculated using at least one of the first and second center axis values and the gradient value,
 wherein the center axis fixing error value includes a process error value obtained when the sensor module is warped at the time of being soldered to a printed circuit board and a mounting error value obtained when the sensor module is warped at the time of being mounted to the vehicle.

2. The vehicle driving assistant device of claim 1, wherein the sensor module includes:
 a sensor unit which outputs an acceleration signal; and
 a signal processing unit which processes the acceleration signal to calculate at least one of the first and second center axis values.

3. The vehicle driving assistant device of claim 2, wherein the sensor unit includes a tri-axial accelerometer which outputs the acceleration signal.

4. The vehicle driving assistant device of claim 2, wherein the signal processing unit outputs the first and second center axis values after converting the acceleration signal into a digital signal.

5. The vehicle driving assistant device of claim 2, wherein the sensor unit includes at least one of a tri-axial accelerometer, a magnetic field sensor, and a gravity sensor, which outputs the acceleration signal.

6. The vehicle driving assistant device of claim 1, wherein the control module includes:
 a gradient value calculating unit which calculates the gradient value with the first and second center axis values;
 an area determining unit which calculates the center axis fixing error value based on at least one of the first and second center axis values and the gradient value and determines the effective area with the center axis fixing error value; and
 a following control unit which follows the object in the effective area when a vehicle driving assisting function is performed.

7. The vehicle driving assistant device of claim 6, wherein when the gradient value is larger than a set reference gradient value, the area determining unit determines that there is an error in determination of the effective area to output a determination error signal to the following control unit.

8. The vehicle driving assistant device of claim 7, wherein:
 the control module further includes an error alarming unit which outputs an error alarm, and
 the following control unit controls the error alarming unit to output the error alarm when the determination error signal is input.

9. The vehicle driving assistant device of claim 6, wherein the gradient value calculating unit calculates the gradient value by subtracting the second center axis value from the first center axis value.

10. The vehicle driving assistant device of claim 6, wherein the area determining unit calculates the center axis fixing error value subtracting the gradient value from the first center axis value or adding the gradient value and the second center axis value.

11. The vehicle driving assistant device of claim 6, wherein the area determining unit shifts a reference effective area set by a shift value corresponding to the center axis fixing error value to determine the effective area.

12. The vehicle driving assistant device of claim 1, wherein the center axis fixing error value of the sensor module is calculated using the first and second center axis values and the gradient value.

* * * * *